United States Patent
Kudoh et al.

(10) Patent No.: US 11,269,549 B2
(45) Date of Patent: Mar. 8, 2022

(54) STORAGE DEVICE AND COMMAND PROCESSING METHOD

(71) Applicant: KIOXIA CORPORATION, Minato-ku (JP)

(72) Inventors: Yoshiyuki Kudoh, Kawasaki (JP); Junpei Futagi, Yokohama (JP)

(73) Assignee: KIOXIA CORPORATION, Minato-ku (JP)

( * ) Notice: Subject to any disclaimer, the term of this patent is extended or adjusted under 35 U.S.C. 154(b) by 54 days.

(21) Appl. No.: 16/522,077

(22) Filed: Jul. 25, 2019

(65) Prior Publication Data

US 2020/0233607 A1      Jul. 23, 2020

(30) Foreign Application Priority Data

Jan. 17, 2019   (JP) .............................. JP2019-006051

(51) Int. Cl.
  *G06F 3/00*  (2006.01)
  *G06F 3/06*  (2006.01)
  *G06F 12/02* (2006.01)
  *G06F 12/14* (2006.01)

(52) U.S. Cl.
CPC .......... *G06F 3/0659* (2013.01); *G06F 3/0622* (2013.01); *G06F 3/0679* (2013.01); *G06F 12/0246* (2013.01); *G06F 12/1408* (2013.01); *G06F 2212/402* (2013.01)

(58) Field of Classification Search
None
See application file for complete search history.

(56) References Cited

U.S. PATENT DOCUMENTS

| | | | |
|---|---|---|---|
| 9,898,201 B2 | 2/2018 | Oikawa et al. | |
| 2011/0058440 A1 | 3/2011 | Smith et al. | |
| 2013/0262762 A1* | 10/2013 | Igashira | G06F 3/0656 |
| | | | 711/114 |
| 2016/0034683 A1* | 2/2016 | Lee | G06F 21/6218 |
| | | | 726/17 |
| 2016/0179402 A1* | 6/2016 | Iwashiro | G06F 3/0688 |
| | | | 711/103 |

FOREIGN PATENT DOCUMENTS

WO   WO 2015/145552 A1   10/2015

* cited by examiner

*Primary Examiner* — Midys Rojas
(74) *Attorney, Agent, or Firm* — Oblon, McClelland, Maier & Neustadt, L.L.P.

(57) ABSTRACT

A storage device includes a storage and a controller. The controller receives commands from a host, and queues, in a command queue, the commands received from the host. The controller queues a first command, which is a command to request changing a security setting of a partial area of the storage, a second command, which is a command to access the partial area of the storage, and a third command, which is a command to access an area of the storage other than the partial area, after queuing the second command. The controller changes order of the commands queued in the command queue so that the third command is executed before the second command is executed.

15 Claims, 7 Drawing Sheets

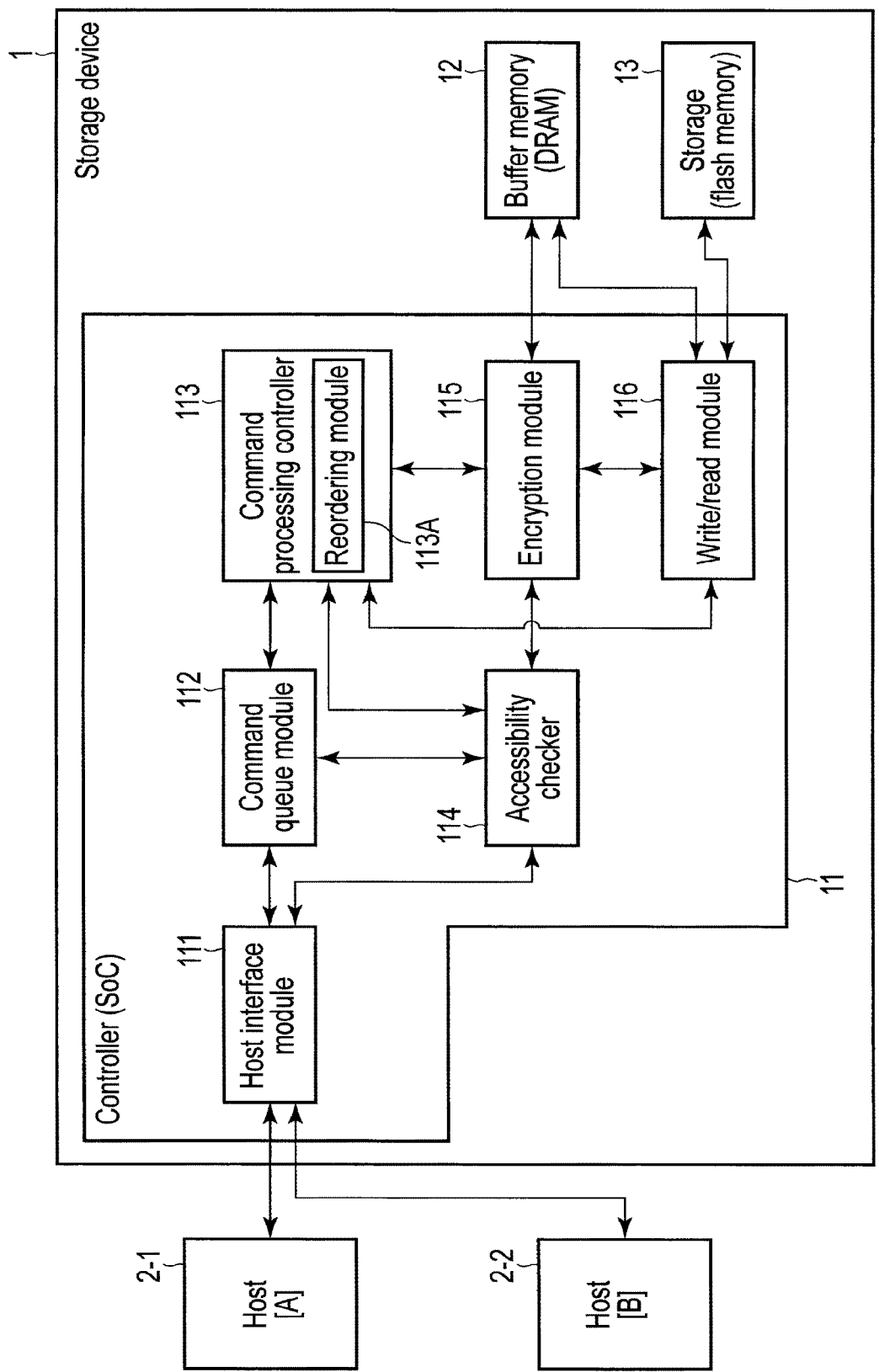
F I G. 1

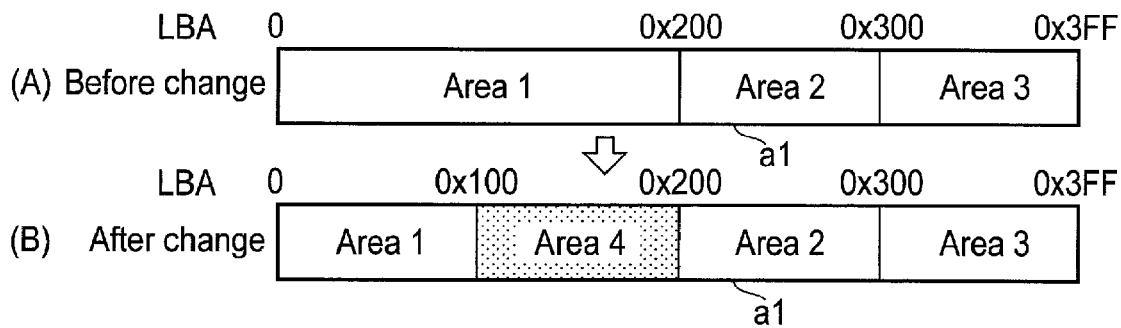
F I G. 4
| Command | Start | Length | Area | Host |
|---|---|---|---|---|
| Write | 0x100 | 0x10 | Area 1 | A |
| Read | 0x100 | 0x10 | Area 1 | A |
| Read | 0x200 | 0x20 | Area 2 | B |
| Read | 0x300 | 0x20 | Area 3 | B |
| Security | — | — | — | A |
| Read | 0x100 | 0x20 | Area 4 | A |
| Read | 0x220 | 0x20 | Area 2 | B |
| Read | 0x320 | 0x20 | Area 3 | B |
| Read | 0x120 | 0x20 | Area 4 | A |
F I G. 5
| Command | Start | Length | Area | Host |
|---|---|---|---|---|
| Write | 0x100 | 0x10 | Area 1 | A |
| Read | 0x100 | 0x10 | Area 1 | A |
| Read | 0x200 | 0x20 | Area 2 | B |
| Read | 0x300 | 0x20 | Area 3 | B |
| Security | — | — | — | A |
| Read | 0x100 | 0x20 | Area 4 | A |
| Read | 0x220 | 0x20 | Area 2 | B |
| Read | 0x100 | 0x20 | Area 4 | A |
| Read | 0x320 | 0x20 | Area 3 | B |
| Read | 0x120 | 0x20 | Area 4 | A |
F I G. 6

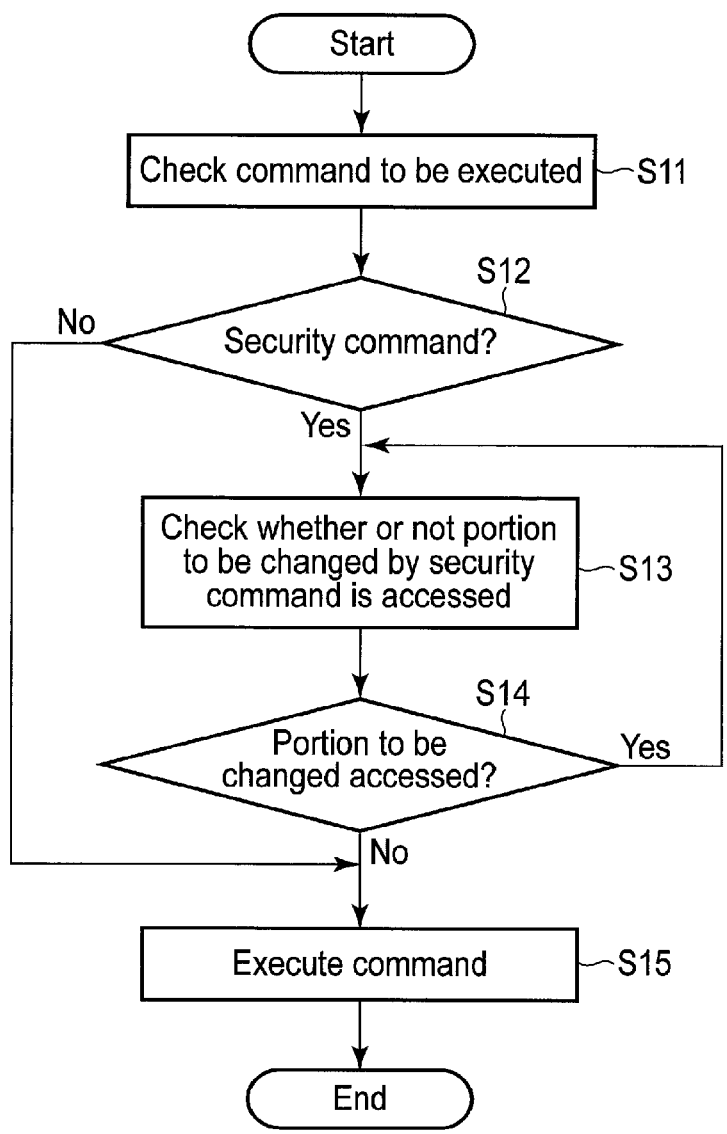
F I G. 9

STORAGE DEVICE AND COMMAND PROCESSING METHOD

CROSS-REFERENCE TO RELATED APPLICATIONS

This application is based upon and claims the benefit of priority from Japanese Patent Application No. 2019-006051, filed Jan. 17, 2019, the entire contents of which are incorporated herein by reference.

FIELD

Embodiments described herein relate generally to a storage device and a command processing method.

BACKGROUND

Storage devices in which sectional areas can be defined and processing such as encryption and accessibility setting can be performed for each area have been recently widespread.

Conventionally, for example, when a change in setting is made to prohibit a write of data to a partial area where both a write and a read of data have been executable, access to an area other than the area also has been withheld and deterioration in latency has been caused.

BRIEF DESCRIPTION OF THE DRAWINGS

FIG. 1 is a diagram illustrating a structure example and a connection example of a storage device according to a first embodiment.

FIG. 4 is a diagram illustrating an example in which a setting of a partial area in a storage area is changed in the storage device according to the first embodiment.

FIG. 5 is a diagram illustrating an example of queued commands before the order of execution is changed in the storage device according to the first embodiment.

FIG. 6 is a diagram illustrating an example in which the order of execution of the queued commands is changed in the storage device according to the first embodiment.

FIG. 9 is a flowchart illustrating an example of an operation procedure for executing commands including a security command in the storage device according to the second embodiment.

DETAILED DESCRIPTION

Figure 2:
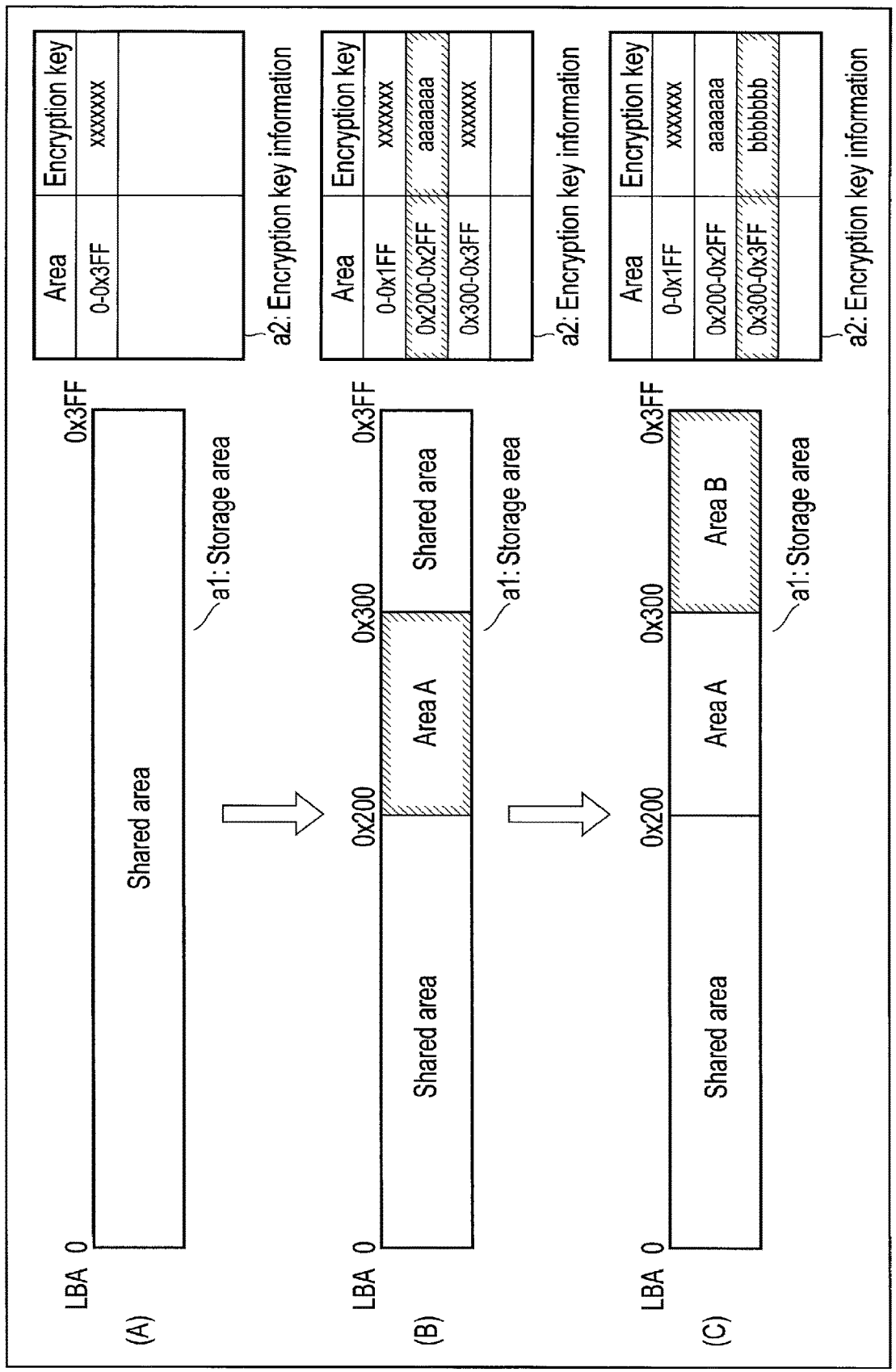
FIG. 2 is a first diagram for explaining a security function (data protection by encryption) of the storage device according to the first embodiment.

Various embodiments will be described hereinafter with reference to the accompanying drawings.

In general, according to one embodiment, a storage device includes a storage and a controller. The controller is configured to receive commands from the host, and queue, in a command queue, the commands received from the host. The controller is further configured to: queue a first command, which is a command to request changing a security setting of a partial area of the storage, in the command queue; queue a second command, which is a command to access the partial area of the storage, in the command queue after queuing the first command, queue a third command, which is a command to access an area of the storage other than the partial area, in the command queue after queuing the second command; and change order of commands queued in the command queue so that the third command is executed before the second command is executed.

First Embodiment

A first embodiment will be described.

FIG. 1 is a diagram illustrating a structure example and a connection example of a storage device 1 according to the present embodiment.

The storage device 1 is a security storage device having a security function of being capable of encrypting data and storing the encrypted data, and limiting access to stored data. The storage device 1 can be connected to a plurality of hosts (host [A] 2-1 and host [B] 2-2) via an interface conforming to, for example, Peripheral Component Interconnect Express (PCIe) (registered trademark).

The storage device 1 receives commands from the host [A] 2-1 and the host [B] 2-2, executes processes corresponding to the commands, and transmits processing results thereof to the host [A] 2-1 and the host [B] 2-2. The commands received by the storage device 1 include at least a write command requesting that data be written, a read command requesting that data be read, and a security command requesting a process relating to the security function. The security command will be described later. The storage device 1 can receive various control commands in addition to the above commands.

The storage device 1 includes a controller 11 which is formed as, for example, a system on a chip (SoC), a buffer memory 12 which is, for example, a dynamic random access memory (DRAM), and a storage 13 which is, for example, a flash memory. The controller and a process of reading data from the storage 13, using the buffer memory 12 as a temporary storage area of the data. The controller 11 includes a host interface module 111, a command queue module 112, a command processing controller 113, an accessibility checker 114, and an encryption module 115. In addition, the controller 11 includes a write/read module 116 which executes a process of writing data to the storage 13 and a process of reading data from the storage 13. Functions of each module in the controller 11 may be realized by, for example, a processor in the controller 11 that executes, for example, a program stored in a memory in the controller 11. Alternatively, functions of each module in the controller 11 may be realized by an electronic circuit. That is, functions of each module can be realized by software, and can be realized by hardware. Moreover, it is also possible that a part of functions of a module is realized by software and another part thereof is realized by hardware. In the storage device 1 according to the present embodiment, it is assumed that reordering by a reordering module 113A, which will be described later, and changing of a security setting by the accessibility checker 114 are performed by hardware. Performing these processes by software might increase overhead that is required for processes other than data access to the storage 13, and the performance of the storage device 1 may not be improved.

An outline of security functions of the storage device 1 will be described herein with reference to FIG. 2 and FIG. 3. The security functions of the storage device 1 can provide data protection by encryption and data protection by access limitation. It should be noted that the security functions of the storage device 1 may provide only one of these two types of data protection. In addition, the security functions of the storage device 1 may provide other types of data protection in addition to one or both of these two types of data protection or instead of these two types of data protection. Moreover, the storage device 1 may also have another security function such as authority authentication with a password. The security functions of the storage device 1, which can provide data protection by encryption and data protection by access limitation, are realized by causing the accessibility checker 114 and the encryption module 115 to cooperate with each other.

FIG. 2 is a diagram for explaining an outline of the data protection by encryption.

A storage area denoted by symbol a1 in FIG. 2 is a part or all of the area of the storage 13, and logically represents an area allocated to one of the host [A] 2-1 and the host [B] 2-2, for example. Alternatively, the storage area a1 may be, for example, a part or all of the area of the storage 13 that is allocated so that both the host [A] 2-1 and the host [B] 2-2 can access. The storage area a1 is allocated by either of the hosts by the above-described control commands. It is herein assumed that the storage area a1 is an area associated with a logical address (logical block address [LBA]) 0-0x3FF in the area of the storage 13. In addition, encryption key information denoted by symbol a2 in FIG. 2 lists an encryption key which is managed by the encryption module 115 to encrypt data to be written to the storage area a1. The encryption module 115 manages the encryption key information a2, using, for example, a memory in the controller 11.

FIG. 2(A) illustrates an initial state of the storage area a1. In the initial state, all the area of the storage area a1 is defined as a shared area. The shared area is an area whose encryption key is shared by the plurality of hosts (the host [A] 2-1 and the host [B] 2-2). When the storage 13 is in the initial state, the encryption module 115 manages only an encryption key (xxxxxxx) for the shared area. In other words, in this case, the encryption key information a2 includes only the encryption key for the shared area. This encryption key for the shared area is generated by the encryption module 115, for example, when a setting of the storage area a1 is determined. In the initial state illustrated in FIG. 2(A), when a write command or a read command targeting the storage area a1 is received, the encryption module 115 encrypts or decrypts data with the encryption key for the shared area.

As described above, commands received by the storage device 1 include a security command requesting a process relating to the security function. The security command can be executed, using different parameters depending on the purpose. As an example of them, a sectional area can be defined in a target range in the storage area a1. In addition, the security command can be issued, for example, to change an encryption key applied to a target sectional area among sectional areas defined in the storage area a1. Defining a sectional area by the security command is activating the security function for each area, and is different from defining a section by a control command for defining, for example, the storage area a1 in the area of the storage 13. Here, a section defined by the control command is referred to as a space section, and a section defined by the security command is referred to as a security section. That is, defining a sectional area by the security command is, for example, setting a security section in the storage area a1, which is one space section defined by the control command. The security section is defined, for example, mainly by the accessibility checker 114 in cooperation with the encryption module 115. In addition, information about the defined security section is stored in, for example, a memory in the controller 11, as information shared between the accessibility checker 114 and the encryption module 115. The security command is also issued to release the security section or to change the range of the security section.

FIG. 2(B) illustrates a state in which an area A (LBA: 0x200-0x2FF) is defined in the storage area a1, which has been in the initial state, by a security command as a new security sectional area, and an encryption key applied to the area A is changed by a security command. Changing the encryption key in this case means setting a new encryption key for the area A. This encryption key is generated by the encryption module 115. The encryption key set for the area A can also be further changed by a security command. When an encryption key for an area is changed, data stored in the area may be invalidated, or may be stored again after being decrypted with an old encryption key to be changed and being encrypted with the changed encryption key. As illustrated in FIG. 2(B), an encryption key (aaaaaaa) for the area A (LBA: 0x200-0x2FF) is added to the encryption key information a2.

The encryption key (aaaaaaa) for the area A is generated by the encryption module 115 when the area A is defined. In addition, information about the defined area A (LBA: 0x200-0x2FF) is shared between the accessibility checker 114 and the encryption module 115 as described above.

In the state illustrated in FIG. 2(B), when a write command or a read command targeting the storage area a1 is received, the encryption module 115 encrypts or decrypts data in the area A with the encryption key for the area A, and encrypts or decrypts data in an area other than the area A with the encryption key for the shared area.

FIG. 2(C) further illustrates a state in which an area B (LBA: 0x300-0x3FF) is defined in the storage area a1 by a security command as a new security sectional area, and an encryption key applied to the area B is changed by a security command. As illustrated in FIG. 2(C), an encryption key (bbbbbbb) for the area B (LBA: 0x300-0x3FF) is added to the encryption key information a2.

In the state illustrated in FIG. 2(C), when a write command or a read command targeting the storage area a1 is received, the encryption module 115 encrypts or decrypts data in the area A with the encryption key for the area A, encrypts or decrypts data in the area B with the encryption key for the area B, and encrypts or decrypts data in an area other than the area A and the area B with the encryption key for the shared area.

Since such a data protection by encryption enables data to be encrypted with a different encryption key for each area, a risk of data being illegally read can be reduced as compared to that in a case where a single encryption key is applied.

Note that in a state in which the security sectional area is not defined as shown in FIG. 2(A), the encryption key for the shared area can be changed by a security command.

Figure 3:
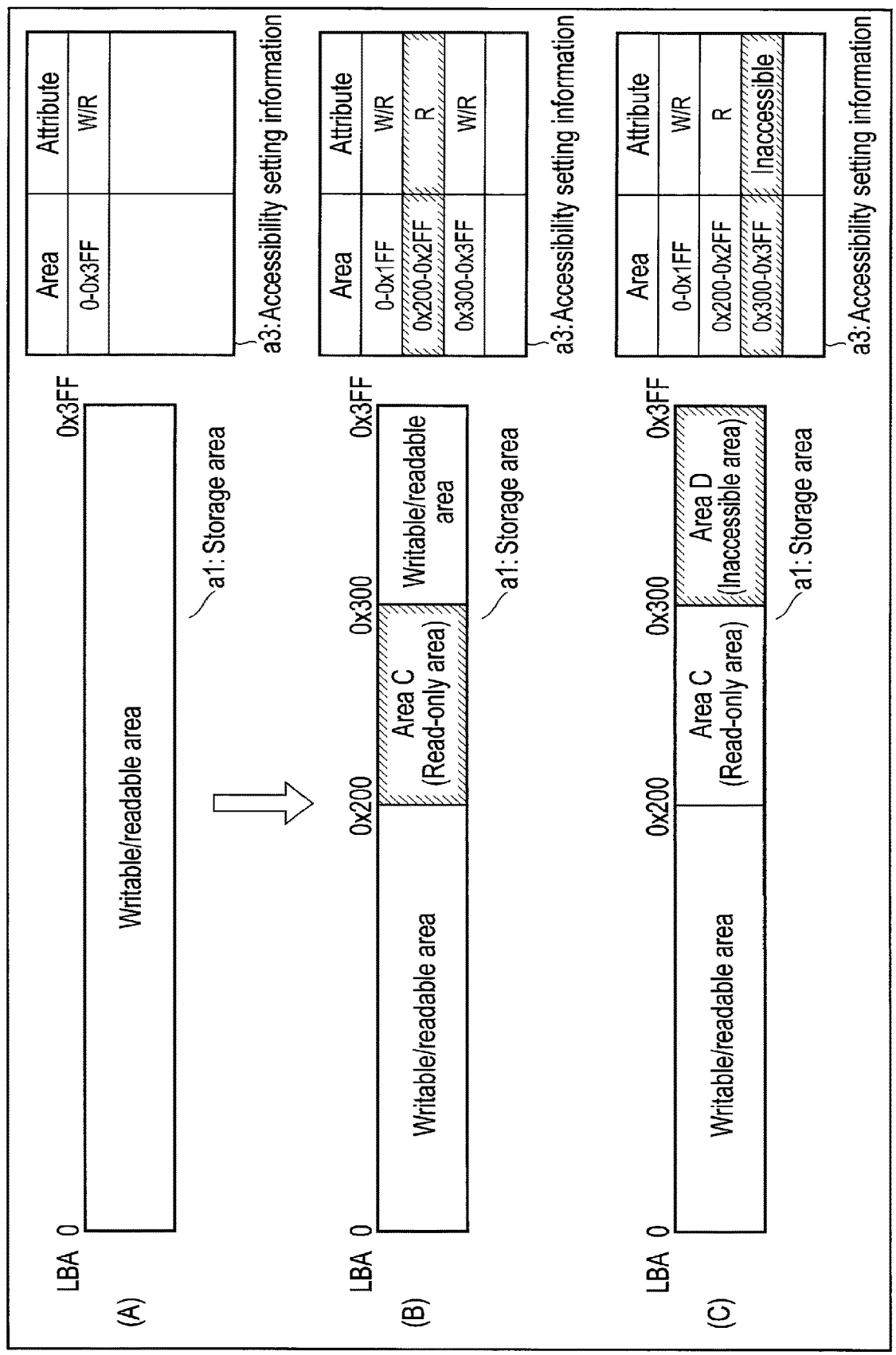
FIG. 3 is a second diagram for explaining the security function (data protection by access limitation) of the storage device according to the first embodiment.

FIG. 3 is a diagram for explaining an outline of data protection by access limitation.

It is also herein assumed that the storage area a1 is defined as an area associated with the logical address (LBA) 0-0x3FF in the area of the storage 13. Accessibility setting information denoted by symbol a3 in FIG. 3 is information which is managed by the accessibility checker 114 to limit access to the storage area a1, which is one space section, in a unit of a sectional area of a security section. The accessibility checker 114 manages the accessibility setting information a3, using, for example, a memory in the controller 11.

FIG. 3(A) illustrates an initial state of the storage area a1. In the initial state, all the area of the storage area a1 is defined as an area where both a data write and a data read are executable. As illustrated in FIG. 3(A), the accessibility setting information a3 includes information indicating that all the area of the storage area a1 (LBA: 0-0x3FF) is an area where both a data write and a data read are executable.

In the initial state illustrated in FIG. 3(A), when a write command or a read command targeting the storage area a1 is received, the accessibility checker 114 determines that the command is executable, whichever range in the storage area a1 the command is related to. For example, in a case of a write command, data is encrypted by the encryption module 115, and written to the storage 13.

FIG. 3(B) illustrates a state in which an area C (LBA: 0x200-0x2FF) is defined in the storage area a1, which has been in the initial state, by a security command as a new security sectional area, and the area C is changed by a security command to a read-only area where a data write is prohibited. As illustrated in FIG. 3(B), information indicating that the area C (LBA: 0x200-0x2FF) is a read-only area is added to the defined as a read-only area, for example, in a case where it is requested that data written in the area be prevented from being updated.

In the state illustrated in FIG. 3(B), when a write command targeting the area C is received, the accessibility checker 114 determines that the write command is inexecutable. In this case, an issuer of the write command is notified of an error via the host interface module 111. When a read command targeting the area C is received, the accessibility checker 114 determines that the read command is executable. In this case, data read from the storage 13 is decrypted by the encryption module 115, and transferred to an issuer of the read command via the host interface module 111.

FIG. 3(C) further illustrates a state in which an area D (LBA: 0x300-0x3FF) is defined in the storage area a1 by a security command as a new security sectional area, and the area D is changed by a security command to an inaccessible area where both a data write and a data read are prohibited. As illustrated in FIG. 3(C), information indicating that the area D (LBA: 0x300-0x3FF) is an inaccessible area is added to the accessibility setting information a3. An area is defined as an inaccessible area, for example, in a case where it is requested that data written in the area be concealed.

In the state illustrated in FIG. 3(C), when a write command or a read command targeting the area D is received, the accessibility checker 114 determines that the command is inexecutable. In this case, an issuer of the command is notified of an error via the host interface module 111.

This data protection by access limitation enables data to be prevented from being updated or data to be concealed for each area, more specifically, for each security section that can be optionally defined in a space section.

A security command can be issued to change, for example an area defined as a read-only area to an area where a data write is executable, or to change an area defined as an inaccessible area to an area where both a data write and a data read executable. That is, a security command can be issued to cancel access limitation. Moreover, a security command can be issued to define an area as, not only a read-only area or an inaccessible area, but also a write-only area.

In consideration of the above-described outline of the security function, each module of the storage device 1 will be further described with reference to FIG. 1 again.

The host interface module 111 receives commands issued to the storage device 1 from the host [A] 2-1 or the host [B] 2-2. The host interface module 111 transfers the received commands to the command queue module 112. The command queue module 112 queues the commands transferred from the host interface module 111. The command queue module 112 queues the commands in the order of receipt from the host interface module 111.

The command processing controller 113 reads the commands queued in the command queue module 112 in order, and instructs the accessibility checker 114, the encryption module 115, the write/read module 116 to execute processes requested by the commands. In addition, the command processing controller 113 deletes a command from the command queue module 112, when a process corresponding to the command ends. The command processing controller 113 includes the reordering module 113A, which changes the order of execution of the commands queued in the command queue module 112. The reordering module 113A will be described later.

The accessibility checker 114 determines a target area of a command to access the storage 13, and determines whether or not the command is executable. The accessibility checker 114 notifies the encryption module 115 of the target area, when it is determined that the command is executable.

When the command which the accessibility checker 114 determines to be executable is a write command to write data to the storage 13, the encryption module 115 encrypts the data with an encryption key applied to the target area notified by the accessibility checker 114. The data to be written is, for example, supplied to the encryption module 115 via the host interface module 111 and the accessibility checker 114. The encryption module 115 supplies the encrypted data to the write/read module 116, for example, via the buffer memory 12, and the write/read module 116 writes the data received from the encryption module 115 into the storage 13. When the command which the accessibility checker 114 determines to be executable is a read command to read data from the storage 13, the encryption module 115 receives data read from the storage 13 by the write/read module 116, for example, via the buffer memory 12, and decrypts the encrypted data with the encryption key applied to the target area notified by the accessibility checker 114. The decrypted data is, for example, transmitted to the host [A] 2-1 or the host [B] 2-2 via the accessibility checker 114 and the host interface module 111.

That is, the host interface module 111 transmits processing results of commands to the host [A] 2-1 and the host [B] 2-2, as well as receiving the commands from the host [A] 2-1 and the host [B] 2-2 as described above. For example, notification that the accessibility checker 114 has determined that a command is inexecutable, notification that a data write to the storage 13 has been successful, and data that is read from the storage 13, are transmitted to the host [A] 2-1 and the host [B] 2-2 which are the issuers of commands, as the processing results of the commands.

At the time when a command next to a security command is about to be executed, the reordering module 113A changes the order of execution of the commands queued in the command queue module 112 so that a command not influenced by the security command is to be executed next to the security command. In other words, when a command to be executed next is influenced by the security command, the order of execution of this command and, for example, a command which is to be executed next to this command and which is not influenced by the security command, is exchanged. That is, the order of execution of the commands queued in the command queue module 112 is changed so that the command not influenced by the security command is executed before the command influenced by the security command.

FIG. 4 is a diagram illustrating an example in which a setting of a partial area in the storage area a1 is changed by a security command. In FIG. 4, diagram (A) illustrates a state before the setting of the partial area in the storage area a1 is changed, and diagram (B) illustrates a state after the setting of the partial area in the storage area a1 is changed.

As illustrated in FIG. 4, it is herein assumed that in an area 1 of a logical address (LBA) 0-0x1FF, an area of a logical address (LBA) 0x100-0x1FF is newly defined as an area 4. This case corresponds to, for example, a case where the area 1 has been an area to which an encryption key for a shared area is applied and the area 4 is newly defined to change an encryption key for a part of the area 1, or a case where the area 1 has been an area where both a data write and a data read are executable and the area 4 is newly defined to change a part of the area 1 to a read-only area where a data write is prohibited.

FIG. 5 is a diagram illustrating an example of commands queued in the command queue module 112 before the order of execution of the commands is changed by the reordering module 113A.

In FIG. 5, the commands queued in the command queue module 112 are listed from top to bottom in the order of execution. Basically, it is herein assumed that the commands are queued in the order of receipt by the host interface module 111. In addition, fields in FIG. 5 (Command, Start, Length, Area, Host) represent, from left, the type of a command, a start address (start LBA) of an area to be accessed, data length, an area to be accessed, and an issuer of the command. For example, the top command is a write command which is issued by the host [A] 2-1 and which requests that data having a length of 0x10 be written from an address of 0x100 in the area 1.

In FIG. 5, a command denoted by symbol b1 is a security command requesting that the partial area of the area 1 illustrated in FIG. 4 be newly defined as the area 4. As illustrated in FIG. 5, there are commands to be executed before the security command b1, and these commands include commands to access an area targeted by the security command b1. To be specific, the commands include a write command b2 requesting that data be written to the area 1 targeted by the security command b1, and a read command b3 requesting that data be read from the area 1 targeted by the security command b1. These commands, which target the area 1, are executed before the setting is changed by the security command b1 as in the state of FIG. 4(A), without being influenced by the security command b1.

In FIG. 5, a command denoted by symbol b4 is a read command which is to be executed next to the security command b1 and which requests that data be read from the area 4 to be defined by the security command b1. The read command b4 has to wait to be executed until a process corresponding to the security command b1 is complete and the area 4 illustrated in FIG. 4(B) is defined.

In general, when a process of changing a security state of the storage area a1 is executed, the storage device 1 keeps access to all the area of the storage area a1 to be pending until the process of changing the security state of the storage area a1 is complete to avoid an erroneous processing result under the influence of the change. That is, while the security command targeting the storage area a1 is being executed, all the write commands and read commands targeting the storage area a1 are kept pending.

In this case, the execution of a write command and a read command irrelevant to a portion to be changed is also kept pending. Thus, the write command and the read command are made to wait for a response, and deterioration in latency is caused.

Thus, in the storage device 1 according to the present embodiment, at the time of execution of a security command, the reordering module 113A changes the order of execution of the commands queued in the command queue module 112 so that a command not influenced by the security command is to be executed next. Moreover, in the storage device 1 according to the present embodiment, the accessibility checker 114 regards a security command as completed when information about a process requested by the security command is temporarily saved in, for example, a memory in the controller 11, and then executes the process on the basis of the temporarily saved information.

FIG. 6 is a diagram illustrating an example in which the order of execution of the commands queued in the command queue module 112 as illustrated in FIG. 5 is changed by the reordering module 113A.

In FIG. 6, a command denoted by symbol b5 is a read command which is to be executed next to the read command b4 and which requests that data be read from an area 2, which is different from the area 1 and the area 4 that are influenced by the security command b1. For example, at the start of the read command b4 which is to be executed next to the security command b1, which is regarded as completed when the information about the process is temporarily saved as described above, the reordering module 113A determines whether or not the read command h4 is influenced by the security command b1. This determination may be made in parallel with the determination of accessibility made by the accessibility checker 114. Since the read command b4 is influenced by the security command b1, the reordering module 113A further determines whether or not the read command b5, which is to be executed next to the read command b4, is influenced by the security command b1.

Since the read command b5 is not influenced by the security command b1, the reordering module 113A changes the order of execution of the read command b4 and the read command b5 in the command queue module 112 so that the read command b5 is executed next to the security command b1. In other words, the reordering module 113A changes the order of execution of the read command b4 and the read command b5 in the command queue module 112 so that the read command b5, which is not influenced by the security command b1, is executed before the command b4, which is influenced by the security command b1. In FIG. 6, a command denoted by symbol b4' is the read command b4 which is postponed in the order of execution.

If the read command b5 is also influenced by the security command b1, the reordering module 113A further determines whether or not a command next to the read command b5 is influenced by the security command b1. For example, if commands are queued after a security command in the order of a command A (influenced), a command B (influenced), and a command C (not influenced), the reordering module 113A changes the order of execution of the commands in the order of the command C (not influenced), the command A (influenced), and the command B (influenced).

In addition, as described above, the accessibility checker 114 temporarily saves information about a partial area of the area 1 to be defined as the area 4, which is requested by the security command b1, and regards the security command b1 as completed. When the security command b1 is complete and the process by the reordering module 113A at the time of execution of the security command b1 ends, the execution of the read command b5, which is reordered to be executed next to the security command b1, is started under the control of the command processing controller 113. The accessibility checker 114 executes the process of defining the partial area of the area 1 to be the area 4, which is regarded as completed but actually is not executed yet, in parallel with the execution of the read command b5 in cooperation with the encryption module 115. For example, it takes a long time to encrypt data again and rewrite data in accordance with a change in an encryption key made by a security command. An improvement in latency can be made by executing a command irrelevant to a portion to be changed by the security command.

Thus, the execution of a write command and a read command irrelevant to the portion to be changed by the security command is not kept pending, and it is possible to prevent the write command and the read command from being made to wait for a response and to prevent deterioration in latency from being caused.

Note that, for the sake of simplification, it has been herein assumed that the commands queued in the command queue module 112 are executed one by one. However, when a plurality of commands can be executed in parallel, the reordering module 113A changes the order of execution of the commands queued in the command queue module 112 in consideration of the number of commands that can be executed in parallel. For example, when three commands can be executed in parallel, the reordering module 113A changes the order of execution so that three commands following a security command do not include a command influenced by the security command.

Figure 7:
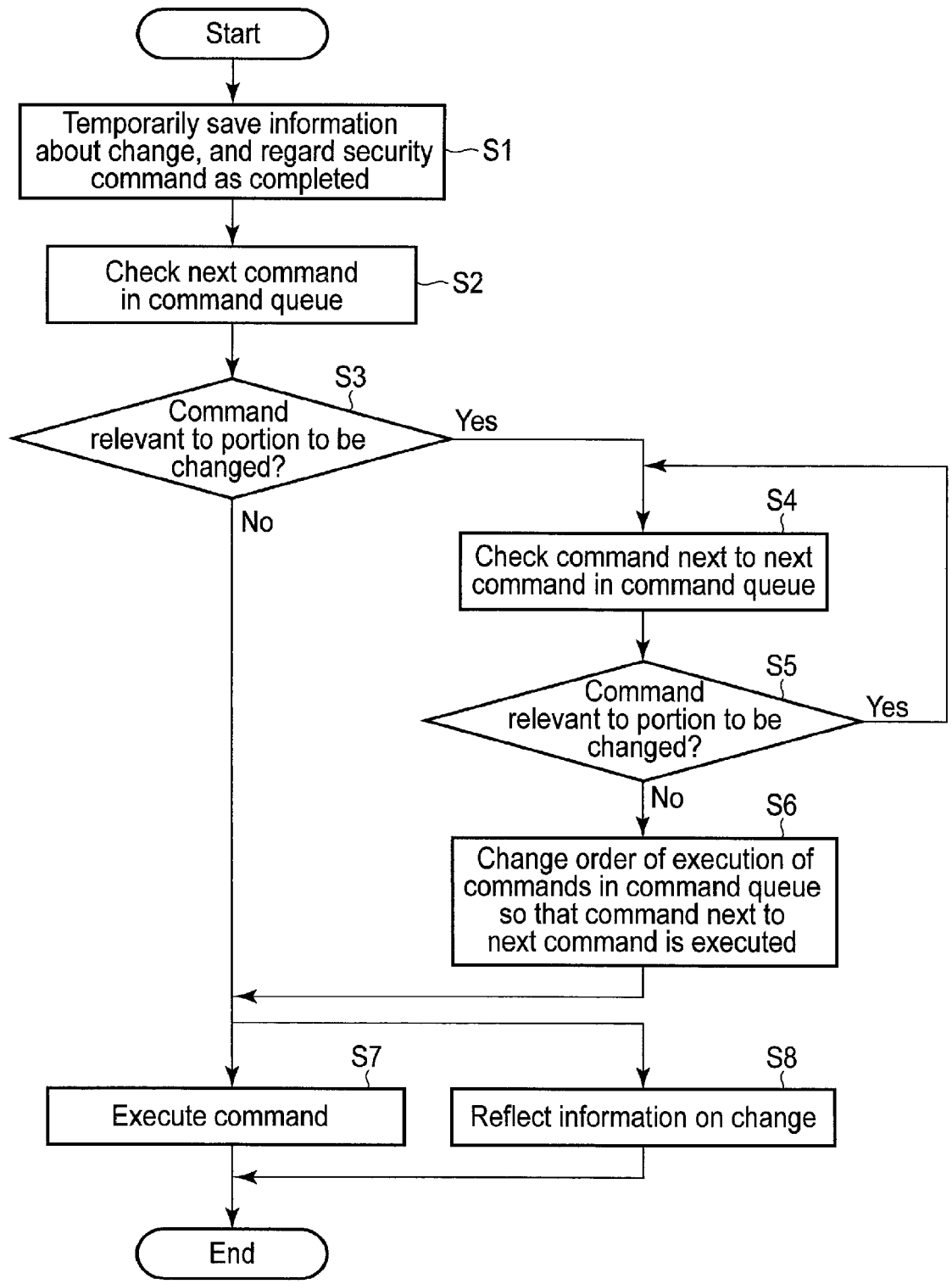
FIG. 7 is a flowchart illustrating an example of an operation procedure carried out when a setting of the storage area is changed by a security command in the storage device according to the first embodiment.

FIG. 7 is a flowchart illustrating an operation procedure for changing a setting of a storage area by a security command in the storage device 1.

When a security command requesting that a setting of the storage area be changed is executed, the accessibility checker 114 temporarily saves information about a change requested by the security command, and regards the security command as completed (step S1).

For example, at the time of start of a command queued in the command queue module 112 as a command to be executed next, the reordering module 113A examines whether or not this next command is a command relevant to a portion in the storage area to be changed by the security command (step S2).

When the next command is relevant to the portion to be changed (step S3: YES), the reordering module 113A examines whether or not a command queued in the command queue module 112 as a command to be executed further next to the next command is a command relevant to the portion in the storage area to be changed by the security command (step S4). When the command to be executed next to the next command is relevant to the portion to be changed (step S5: YES), the reordering module 113A returns to step S4, and repeats the processes of steps S4 and S5 until a command irrelevant to the portion in the storage area to be changed by the security command is retrieved (step S5: NO). When the command irrelevant to the portion in the storage area to be changed by the security command is retrieved (step S5: NO), the reordering module 113A changes order of the commands queued in the command queue module 112 so that the retrieved command is placed as a command to be executed next (step S6). That is, the reordering module 113A changes the commands queued in the command queue module 112 so that the command irrelevant to the portion in the storage area to be changed by the security command is executed before the command relevant to the portion in the storage area to be changed by the security command is executed.

When the command queued in the command queue module 112 as the command to be executed next is a command irrelevant to the portion in the storage area to be changed by the security command (step S3: NO), or after the commands queued in the command queue module 112 are changed (step S6), the command processing controller 113 starts the execution of the command queued in the command queue module 112 as the command to be executed next (step S7).

In addition, in parallel with the execution of the command started in step S7, the accessibility checker 114 executes a process for reflecting the information about the change saved in step S1 in cooperation with the encryption module 115 (step S8).

As described above, in the storage device 1 according to the present embodiment, for example, when the storage area is changed as illustrated in FIG. 4, the area 2 and an area 3, which are irrelevant to the portion to be changed, can be accessed without delay, although access to the area 2 and the area 3 has been conventionally delayed. That is, the storage device 1 according to the present embodiment can improve in latency.

Second Embodiment

A second embodiment will be described.

Figure 8:
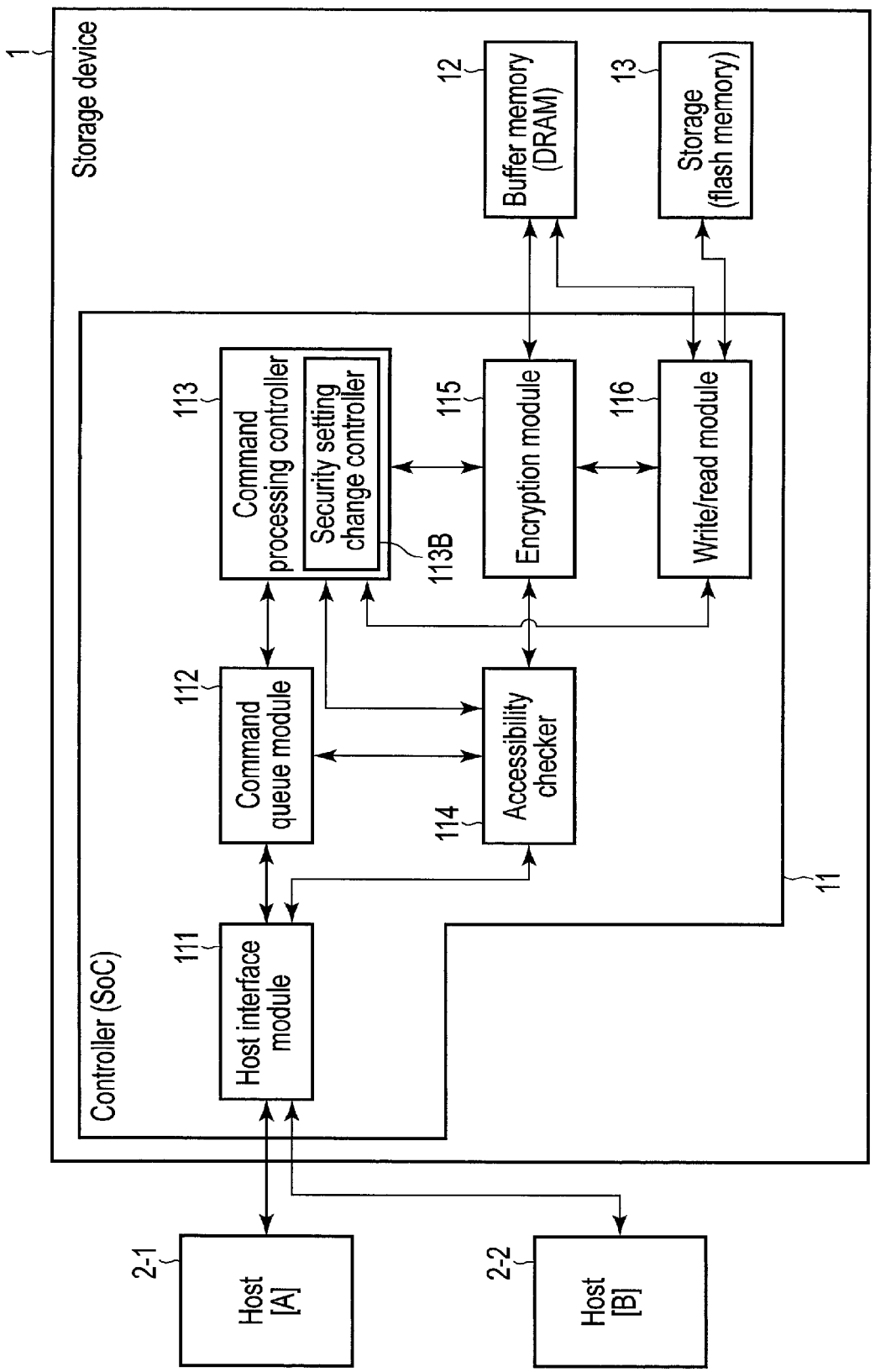
FIG. 8 is a diagram illustrating a structure example and a connection example of a storage device according to a second embodiment.

FIG. 8 is a diagram illustrating a structure example and a connection example of a storage device 1 according to the present embodiment. Also in the present embodiment, it is assumed that the storage device 1 is a security storage device having a security function of being capable of encrypting data and storing the encrypted data, and limiting access to stored data as in the case of the first embodiment. The same structural elements as those of the first embodiment will be herein denoted by the same symbols, and an repeated explanation thereof will be omitted.

In the storage device 1 according to the present embodiment, a command processing controller 113 of a controller 11 includes a security setting change controller 113B instead of the reordering module 113A of the first embodiment. That is, in the storage device 1 according to the present embodiment, the order of execution of commands queued in a command queue module 112 is not changed.

In addition, an accessibility checker 114 of the controller 11 in the storage device 1 according to the present embodiment temporarily saves information about a process requested by a security command and regards the security command as completed, and then executes the process on the basis of the temporarily saved information, upon receipt of an instruction from the security setting change controller 113B. When the security command is to be executed, the security setting change controller 113B monitors access to a portion to be changed by the security command, and instructs the accessibility checker 114 when the portion to be changed is not accessed. Whether or not the portion to be changed by the security command is accessed can be determined on the basis of information about the commands queued in the command queue module 112.

In this manner, the storage device 1 according to the present embodiment can improve in latency by applying a setting change made by a security command, for example, a change of an encryption key, under condition that a portion to be changed is not accessed.

It is assumed that a process executed by the security setting change controller 113B is executed by hardware. Performing this process by software might increase overhead that is required for processes other than data access to a storage 13, and the performance of the storage device 1 may not be improved.

FIG. 9 is a flowchart illustrating an example of an operation procedure for executing commands including a security command in the storage device 1 according to the present embodiment.

The security setting change controller 113B checks a command read from the commands queued in the command queue module 112 (step S11), and determines whether or not the command is a security command (step S12). When the command is not a security command (step S12: NO), the command is immediately executed under the control of the command processing controller 113 (step S15).

In contrast, when the command is a security command (step S12: YES), the security setting change controller 113B examines whether or not a portion to be changed by the security command is accessed (step S13). If the portion to be changed is not accessed (step S14: NO), the security setting change controller 113B instructs the accessibility checker 114 to execute the security command, which is regarded as completed (step S15). If the portion to be changed is accessed (step S14: YES), the security setting change controller 113B returns to step S13, and continues monitoring access to the portion to be changed.

In this manner, also in the storage device 1 according to the present embodiment, deterioration in latency caused by a security command is prevented, and an improvement in latency is achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a storage; and
a controller configured to:
receive commands from a host; and
queue, in a command queue, the commands received from the host; wherein
the controller is further configured to:
queue a first command in the command queue, the first command being a command to request changing a security setting of a partial area of the storage;
queue a second command in the command queue after queuing the first command before executing the first command, the second command being a command to access the partial area of the storage;
queue a third command in the command queue after queuing the second command before executing the first command, the third command being a command to access an area of the storage other than the partial area; and
in response to determining that the third command is a command to access the area of the storage other than the partial area, change order of commands queued in the command queue so that the third command is executed before the second command is executed.

2. The storage device of claim 1, wherein
the controller includes a memory and is further configured to:
save information about the security setting of the partial area requested by the first command; and
start executing a process corresponding to the third command when the information is saved.

3. The storage device of claim 2, wherein
the controller is further configured to execute a process corresponding to the first command in parallel with the process corresponding to the third command.

4. The storage device of claim 3, wherein
the first command requests that an encryption key used to encrypt data to be stored in the partial area be changed.

5. The storage device of claim 3, wherein
the first command requests that access to the partial area be limited, limitation for accessing the partial area be changed, or limitation for accessing the partial area be canceled.

6. The storage device of claim 3, wherein
the first command requests that a section be defined in the partial area.

7. The storage device of claim 1, wherein
the first command requests that an encryption key used to encrypt data to be stored in the partial area be changed.

8. The storage device of claim 1, wherein
the first command requests that access to the partial area be limited, limitation for accessing the partial area be changed, limitation for accessing the partial area be canceled.

9. The storage device of claim 1, wherein
the first command requests that a section be define in the partial area.

10. The storage device of claim 1, wherein
the controller includes a hardware circuit and a processor configured to execute firmware, and
the changing of the order of commands queued in the command queue is executed not by the processor but by the hardware circuit.

11. A command processing method of a storage device, the method comprising:
queuing a first command in a command queue, the first command being a command to request changing a security setting of a partial area of a storage of the storage device;
queuing a second command in the command queue after queuing the first command before executing the first command, the second command being a command to access the partial area of the storage;
queuing a third command in the command queue after queuing the second command before executing the first command, the third command being a command to access an area of the storage other than the partial area; and
in response to determining that the third command is a command to access the area of the storage other than the partial area, changing order of commands queued in the command queue so that the third command is executed before the second command is executed.

12. The command processing method of claim 11, further comprising:
   saving information about the security setting of the partial area requested by the first command in a memory; and
   starting executing a process corresponding to the third command when the information is saved.

13. The command processing method of claim 12, further comprising
   executing a process corresponding to the first command in parallel with the process corresponding to the third command.

14. The command processing method of claim 13, wherein
   the first command requests that an encryption key used to encrypt data to be stored in the partial area be changed.

15. The command processing method of claim 13, wherein
   the first command requests that access to the partial area be limited, limitation for accessing the partial area be changed, limitation for accessing the partial area be canceled, or a section be defined in the partial area.

\* \* \* \* \*